United States Patent

Osberg et al.

[15] 3,699,173
[45] Oct. 17, 1972

[54] EMULSIFIABLE POLYMERIC HINDERED PHENOLS AND THEIR USE AS STABILIZERS

[72] Inventors: Edward V. Osberg, Andover; Walter Beck, Bedford, both of Mass.

[73] Assignee: Stepan Chemical Company, Wilmington, Mass.

[22] Filed: March 22, 1971

[21] Appl. No.: 126,917

[52] U.S. Cl.........260/613 B, 260/45.95, 260/23.7 M
[51] Int. Cl..............................................C07c 43/26
[58] Field of Search..................................260/613 B

[56] References Cited

UNITED STATES PATENTS

| | | |
|---|---|---|
| 2,543,489 | 2/1951 | De Groote et al..260/613 B X |
| 2,598,234 | 5/1952 | De Groote et al......260/613 B |
| 2,930,778 | 3/1960 | Boettner.............260/613 B X |

FOREIGN PATENTS OR APPLICATIONS 1,054,298   1/1967   Great Britain .........260/613 B

*Primary Examiner*—Bernard Helfin
*Attorney*—Richard P. Crowley and Richard L. Stevens

[57] ABSTRACT

Water-emulsifiable hindered polymeric phenols particularly used as stabilizers in polymeric latex compositions are prepared by condensing a hindered phenol with a water-soluble or water-emulsifiable phenolic compound. Typical polymeric hindered phenols are ethoxylated polymeric alkyl-hindered phenols having the structure:

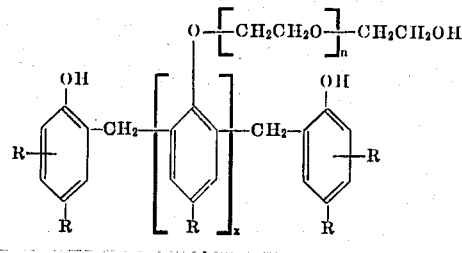

wherein R represents an ortho $C_4$–$C_{12}$ alkyl group, $n$ is a number from 10 to 80 and $x$ is 1, 2 or 3. Such ethoxylated polymeric hindered phenols are prepared by polymerizing a dialkyl hindered phenol with ethoxylated alkyl phenol employing formaldehyde in an acid medium.

8 Claims, No Drawings

EMULSIFIABLE POLYMERIC HINDERED PHENOLS AND THEIR USE AS STABILIZERS

BACKGROUND OF THE INVENTION

Hindered phenols; that is, substituted phenolic compounds having at least the ortho positions of the phenolic compound blocked by substituent groups, particularly alkyl groups, such as bulky branched alkyl groups like tertiary butyl groups, have been commercially employed as stabilizers and antioxidant additives in a wide variety of polymers. A typical commercially employed hindered phenol used as a stabilizer would include 2,2'methylene bis 2 tertiary butyl paracresol. In general, hindered phenols are particularly useful as stabilizers and antioxidants when employed in polymeric latex compositions, such as in natural and synthetic conjugated diene elastomers, as well as synthetic polymeric latices. Typical stabilizers useful in nonaqueous polymeric compositions, such as phosphites like trisnonylphenyl phosphite or metal soaps, tend to hydrolyze when incorporated into polymeric latex compositions, affecting their stabilizing properties and providing poor shelf or storage life for the polymeric latex. Hindered phenols, due to their hydrolysis resistance, are, therefore, widely employed in polymeric latex compositions. However, hindered phenols are difficult to emulsify in such polymeric latex compositions. Typically, hindered phenols are incorporated into polymeric latex in combination with surfactants or dispersing aids or soaps, such as lauryl alcohol or sodium oleate. Accordingly, a hindered phenol useful as a stabilizer which is readily or easily dispersed or emulsifiable in polymeric latex compositions would be desirable.

There are a number of ethoxylated phenolic compounds which are surface active agents or emulsifiers, while another class of phenolic compounds are antioxidants or stabilizers, such as the ether-substituted phenols. Typical phenolic compounds which act as emulsifiers and surface active agents would include ethoxylated-type phenols, such as the alkylphenoxypolyethoxyethanols. Phenol compounds which act as emulsifiers are set forth in U.S. Pat. Nos. 2,504,064, 2,598,234, 2,930,778, 3,064,057, and 3,100,230. The ethoxylated phenols disclosed in these patents are surface active agents and have little or no antioxidant or stabilizing properties in polymeric latices.

There are a number of ether-substituted phenols, which compounds incorporate an ether linkage into the phenolic molecule with generally the ether linkage being a simple alkyl-aryl ether as distinguished from ethoxy groups which are ether alcohols. This general class of ether-substituted phenols, although antioxidants, have little or no emulsifying or surface active properties. Typical compounds of this class are disclosed in U.S. Pat. Nos. 2,613,230, 2,972,600, 3,013,086, 3.029,183, 3,067,259, 3,109,829, 3,364,267 and 3,511,882.

SUMMARY OF THE INVENTION

Our invention concerns water-emulsifiable polymeric hindered phenol compounds, the process of preparing such compounds, polymeric compositions containing such compounds and the use of such compounds as stabilizers, particularly in polymeric latex compositions. In particular, our invention relates to an ethoxylated dialkylated polymeric hindered phenol wherein three, four or more phenol radicals are linked through their ortho or para positions by alkylene groups, such as methylene groups. Our water-emulsifiable polymeric hindered phenols are prepared by condensing a water-emulsifiable or water-soluble phenolic compound with a hindered phenolic compound by reacting said compounds in the presence of a methylene generating or forming compound, such as formaldehyde in the presence of an acid or alkaline catalyst. More particularly, our invention involves the employment of our water-emulsifiable hindered phenols as stabilizing or antioxidant additives by incorporating such compounds having balanced stabilizing and water-emulsifying properties as desired into a natural or synthetic elastomeric or polymeric latex.

In its broadest aspect, our invention concerns water-emulsifiable polymeric hindered phenolic compounds, prepared by linking, typically through the ortho or para positions, a hindered phenolic compound having antioxidant or stabilizing properties with a water-soluble or water-emulsifiable phenolic compound. The water-soluble or water-emulsifiable phenolic compound should be free of substituent groups in at least both ortho or one ortho and a para position and be capable of being condensed with a substituted hindered phenol or partially hindered phenol, having at least one ortho or para position available. The condensation reaction is carried out by reacting the compounds with an aldehyde in either an acid or an alkaline medium employing less than a stoichiometric amount of the aldehyde to provide the fusible soluble condensation product. In one preferred process, an alkylphenoxypolyethoxyethanol is condensed in the presence of formaldehyde in an acid medium with a dialkylated substituted hindered phenol to provide a water-emulsifiable polymeric hindered phenol suitable for use as a stabilizer which is readily incorporated and emulsified in a synthetic conjugated diene elastomeric or polymeric latex composition.

In one embodiment, our water-emulsifiable polymeric hindered phenols may be represented by the structural formula:

I

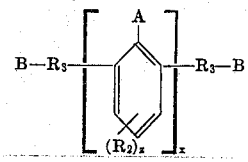

where:

B is

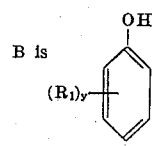

and where A is a water-soluble monovalent radical such as:

wherein $R_1$ is a monovalent radical, such as an aliphatic, cycloaliphatic, or aryl organic radical or a hydroxy radical; for example, an organic radical selected from the group consisting of alkyl, alkenyl, cycloalkyl, cycloalkylene, phenyl, alkylphenyl, alkenylphenyl. Preferably, in one embodiment, $R_1$ represents a $C_4$–$C_{12}$ alkyl radical, and more preferably, a secondary or tertiary branched alkyl radical, the alkyl radical in the ortho position where $y$ is 1 or both in the ortho and para position where $y$ is 2, the alkyl radicals being the same or different. Typical alkyl radicals being, but not limited to, methyl, ethyl, propyl, isopropyl, butyl, secondary butyl, tertiary butyl, amyl, hexyl, nonyl, octyl, etc.;

$R_2$ is a monovalent radical, such as an aliphatic, cycloaliphatic or aryl organic radical or hydrogen; for example, an organic radical selected from the group consisting of alkyl, alkenyl, cycloalkyl, cycloalkylene, phenyl, alkylphenyl, alkenylphenyl. In one embodiment, it is preferred that $R_2$ represent a hydrogen or straight or branch-chained alkyl radical, particularly a $C_1$–$C_{12}$ alkyl radical where $z$ is 1;

$R_3$ is a divalent radical, such as an aliphatic, cycloaliphatic or aryl radical; for example, an organic radical selected from the group consisting of divalent radicals of alkylidene, cycloalkylidene, arylalkylidene or alkylphenyl alkylidene, or alkylidene ether. In one embodiment, it is preferred that $R_3$ be a divalent methylene radical ($-CH_2-$) or a bis methylene ether radical ($-CH_2-O-CH_2-$);

$R_4$ is a divalent radical, such as an alkylidene radical, and in one preferred embodiment, the alkylidene radical is a $C_2$–$C_6$ alkylidene, such as ethylidene, propylidene or a siloxane;

where X is an oxygen or a nitrogen atom, preferably an oxygen atom wherein $x$ is typically a number from about 1 to 6, preferably 1, 2 or 3, wherein $y$ is a number from 1 to 4, such as 1, 2, 3 and 4, preferably 1 or 2, wherein $z$ is a number from about 1 to 3 — 1, 2 or 3, preferably 1, wherein $n$ is a number from about 2 to 100, preferably from about 5 to 80; for example 10 to 60.

As used herein, the term "alkyl" means a saturated monovalent aliphatic radical, including straight and branch-chained radicals as illustrated by, but not limited to, methyl, n-amyl, n-hexyl, 2 heptyl, n-heptyl, 3-methyl-2-octyl, n-octyl, nonyl, 2 tetradecyl, secondary butyl and tertiary butyl.

As used herein the term "alkenyl" means monovalent aliphatic radicals of from about three to seven carbon atoms which contain at least one double bond and are either straight or branch-chained as illustrated by, but not limited to, 1-(2-propenyl), 1-3-methyl-2-propenyl), 1-(2-hexenyl) and the like.

As used herein the term "cycloalkyl" means cyclic saturated aliphatic radicals of from three to eight carbon atoms as illustrated by, but not limited to, cyclopropyl, cyclobutyl, 2 methyl cyclobutyl, cyclohexyl, 4 methyl cyclohexyl, cyclooctyl and the like.

As used herein the term "alkylaryl and alkylphenyl" means a monovalent radical consisting of a phenyl nucleus bonded to the rest of the molecules respectfully to a monovalent radical but directly to the rest of the molecules through another radical. It is also recognized that the aliphatic, cycloaliphatic and aryl radicals can typically vary in any number and kind of substituent groups, such as would occur to the man skilled in organic chemistry and solely for the purposes of illustration or without limitation, substituent groups may include alkoxy, halo, chloro, bromo, iodo or fluoro, nitro and the like.

In one specific embodiment of our invention, our emulsifiable polymeric hindered phenols may comprise an ethoxylated polymeric hindered phenol having a structure as follows:

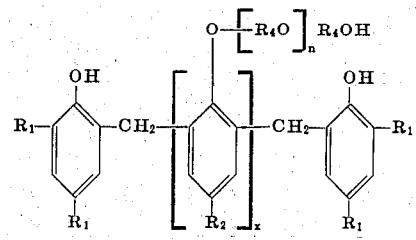

wherein $R_1$ is $C_4$–$C_{12}$; e.g., tertiary butyl; $R_2$ is $C_6$–$C_{12}$; e.g., octyl or nonyl; $R_4$ is a $C_2$–$C_3$ divalent radical; e.g., ($-CH_2CH_2-$ or $-CH_2-CH_2-CH_2-$); and $x$ is 1 or 2.

This water-emulsifiable ethoxylated polymeric hindered phenol is prepared by polymerizing a dialkyl hindered phenol with an alkylphenoxypolyethoxyethanol employing formaldehyde in a condensing reaction in an acid medium. Typical substituted hindered phenols which may be employed in the practice of our invention to constitute the stabilizer function of our water-emulsifiable polymeric hindered phenols would include, but not be limited to: 2, tertiary butyl ortho para phenol; 2,6 ditertiary butyl phenol; 2 tertiary butyl para cresol; and 2 tertiary butyl para nonyl phenol. The alkyl groups may vary from $C_1$–$C_{16}$, the only requirement being that either the $C_4$ or $C_6$ position on the phenolic ring must be vacant.

Typical water-soluble or water-emulsifiable phenolic compounds which may be employed as the water-soluble or water-emulsifiable component of our water-emulsifiable polymeric hindered phenols would include, but not be limited to, those alkyl-aryl polyether surfactants, alcohol, sulfonates and sulfates (for example, sold under the name Triton), such as the alkylphenoxypolyethoxyethanols as well as the alkylphenoxypolypropenyloxypropanols as well as the phenol surfactants prepared by the reaction of a phenolic component with an ethylene imine and the substituted ethylene imine, such as the alkylphenoxypolyethyleneimine imines. Typical water-soluble or water-emulsifiable phenolic components would include, but not be limited to nonylphenoxypolyethoxyethanol, octylphenoxypolyethoxyethanol, nonylphenoxypolypropoxypropanol, octylphenoxypolypropoxypropanol, hexylphenoxypolybutoxybutanol and the like.

Any alkylated substituted phenol may be polymerized with an ethoxylated mono or dialkyl phenol to provide the water-emulsifiable hindered polymeric phenols of our invention, the only requirement being that the hindered phenol must have an available ortho or para position for condensation with the ortho or para position of the ethoxylated alkyl phenol. In general, at least two moles of the hindered phenol are usually employed for each mole of the water-soluble or ethoxylated phenol compound or mixture of ethoxylated and nonethoxylated phenol compounds. Where a mixture of ethoxylated and nonethoxylated phenolic compounds are employed, their mole fraction should add up to one mole. The mole ratio of the water-soluble, for example, the ethoxylated to the stabilizers; that is, the nonethoxylated phenolic compound, may vary as desired, depending upon the degree of water emulsification desired in the molecule or the degree of stabilization or antioxidant properties. The mole ratio may vary, for example, from 0.05:0.95 to as much as 100.00. Particularly preferred ratios would vary from about 10 to 50 to 1. The emulsifiability of our polymeric hindered phenols may be varied by controlling the amount and type of the water-soluble or water-emulsifiable phenolic component of the compound and the degree of ethoxylation.

In general, since the primary purpose is to provide a polymeric hindered phenol having stabilizing properties, the phenolic hindered phenol portion of the molecule should be maintained as large as possible with the water-emulsification portion of the molecule adjusted as desired to obtain the desired degree of water-emulsification. The percentage of ethoxylated phenolic compounds, employed in a polymeric phenol may vary or, if desired, the degree of ethoxylation or water solubility may be adjusted. By judicious control of the degree of ethoxylation; that is, say, for example, from 40 to 80 or more ethoxy groups, a hindered polymeric phenol can be obtained which is readily emulsifiable by merely hand stirring into a polymeric latex composition, and yet possess sufficient antioxidant and stabilizing properties. In our invention the emulsifiability of polymeric hindered phenols is dramatically improved without detracting substantially from the antioxidant or stabilization properties of the compound, even though a portion of the hindered phenolic hydrogens have been replaced by an ethoxy group.

In the structural formula given (I), the basic phenolic compound may be a phenol or resorcinol or other hydroxyl benzyl compound substituted or unsubstituted, while the water-soluble or water-emulsifiable phenolic compound may comprise one that has one or more polyether, amino or silane groups attached thereto to impart the desired degree of water emulsification. While it is recognized that there are a vast number of compounds from which each component of our polymeric hindered phenol compounds may be selected, in practice and for commercial use, those hindered phenols which are presently commercially or usefully employed as stabilizers in polymeric latices are our preferred hindered phenols, while those water-emulsifiable and water-soluble phenolic compounds, such as the alkylphenoxypolyethoxyethanol compounds, are particularly preferred as the starting ingredients in the preparation of our polymeric hindered phenols. The formula (II) is shown having the methylene bridge through the ortho position; however, it is recognized that the methylene bridge may also be through the para position or a combination of the ortho and para positions.

Our water-emulsifiable polymeric hindered phenols are prepared by a condensation reaction between the individual phenolic components. Typically, such reaction involves the condensation reaction between the hindered phenol and the water-emulsified phenol; for example, between the mono or dialkylated hindered phenol and the alkylphenoxypolyethoxyethanol in the presence of an aldehyde, such as an aliphatic aldehyde like furfural, formaldehyde, paraformaldehyde, acetaldehyde, or a compound which, during the reaction, generates or produces an aldehyde such as formaldehyde or methylene radicals. The reaction may be carried out preferably in the presence of an acid catalyst or acid medium, or in certain cases, as to hereinafter described in the presence of an alkylene medium. The amount of the aldehyde employed or the preferred aldehyde employed; that is, formaldehyde, should be employed in less than a stoichiometric amount in order to provide the fusible soluble condensation novolak-type product, rather than the more infusible insoluble cross-linked product occasioned by the use of more than a stoichiometric amount of a formaldehyde. Typically, formaldehyde may be employed in an amount of from 0.1 to 0.9, such as 0.2 to 0.75, moles per mole of the phenol components.

The reaction of the formaldehyde in the presence of an acid catalyst, such as, for example, a carboxylic acid like oxalic acid or a similar acid catalyst employed in the preparation of phenol-formaldehyde novolak resins, produces our water-emulsifiable polymeric hindered phenols containing methylene radicals bridging the phenolic molecules between the ortho-para positions between the individual phenolic molecules. For example, an alkylated phenolic compound and an ethoxylated alkyl phenolic compound are typically heated and then a paraformaldehyde and a small amount of an acid catalyst employed, the mixture heated to reflux and the water of condensation distilled off, and the residual water-emulsifiable hindered polymeric phenol recovered.

The degree of emulsifiability is regulated by varying the number of ethoxyl groups on the phenolic molecule. For example, the greater number of groups, the greater the degree of water emulsification, and the portion of the ethoxylated compound to the nonethoxylated compound in the mixture, such as by blending a nonethoxylated and ethoxylated compound together. In addition, the degree of emulsification can also be varied by varying the proportion of ethoxylated phenol to the hindered phenol prior to the condensation reaction. However, the sum of the mole ratio of the hindered and the ethoxylated phenols add up to one where the dialkyl phenols remain constant at two. Our water-emulsifiable polymeric hindered phenols may also be prepared by carrying out a condensation reaction in an alkaline medium in the presence of an aldehyde, such as at a pH of from about 7 to 14 in the presence of Lewis base, such as sodium methylate or sodium hydroxide and formaldehyde, in which event, the methylolated bridge compound is obtained in the ortho or para positions, and then this compound subsequently reacted with a phenolic component in an acid medium to produce our water-emulsifiable hindered phenols. In the cases of alkaline condensation reactions, the linking group is a bis ether methylene represented by $CH_2-O-CH_2-$ rather than the methylene $CH_2$-radical. The alkaline condensation reaction was similar to that also of the preparation of phenol-formaldehyde resinous novolak products through a two-step alkaline condensation reaction.

Our water-emulsifiable polymeric hindered phenols may also be prepared by directly incorporating the water emulsification or group into the polymeric hindered phenol molecule. For example, our water-emulsifiable compounds may be prepared where they represent an alkylated hindered ethoxylated phenol by direct ethoxylation through the use of ethylene oxide (or other alkylene imine or oxide molecules, such as an ethylene imine or propylene oxide, epichlorohydrin and the like) if a portion of the hydroxyl groups are protected by esterification or some other means. Such a process would require the regeneration of the hindered phenolic hydroxyl groups after the incorporation of the water-emulsifiable groups into the molecule; that is, after ethoxylation. This process is not recommended as being presently impractical from an economical and commercial view. For example, in order to protect the hydroxyl groups of the hindered phenols, an ester or ether hindered phenol would have to be prepared. The ethers would be expensive to make and difficult to remove the ether groups, while the esters, though easier to remove, are difficult to make directly from the phenolic compounds. In the preparation of an ester, one process would be to prepare an acid chloride which would then be esterified with the desired hindered phenol. The resulting product could then be polymerized with a phenol through our condensation reaction. Later, the desired degree of emulsification through the introduction of alkylene oxide or alkylene imine groups, such as ethoxy groups, could be accomplished by direct ethoxylation of the molecule with ethylene oxide, with a final step of hydrolyzing the resulting molecule to regenerate the phenolic hydroxyl groups on the hindered phenol. It should be pointed out that direct ethoxylation by propylene oxide, ethylene oxide, epichlorohydrin, ethylene imines and the like with the unprotected hindered phenol or the unprotected polymeric phenol would not produce the desired stabilizing product of our invention, since each unprotected hydroxyl group would react and the resulting product would not represent a hindered phenol suitable for use as a stabilizer. For example, with the reaction of a substituted phenol or a polymeric hindered phenol with ethylene oxide, each unprotected hydroxyl group would become ethoxylated before any appreciable polymer ethoxy groups could be formed with the result that the product would not be a hindered phenol.

The condensation process for preparing a preferred compound as set forth in structural formula 2 is illustrated by the following reaction:

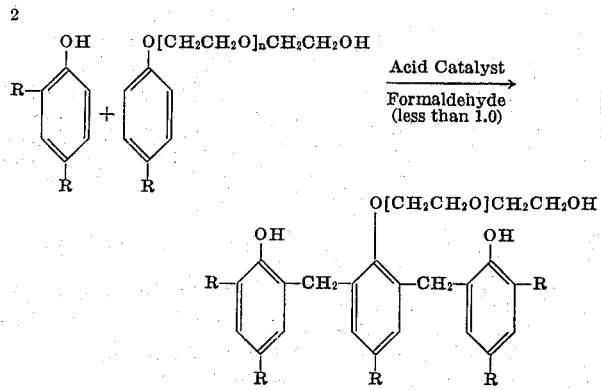

The same product may be prepared employing an alkaline catalyst in which the condensation reaction is represented in the following reaction:

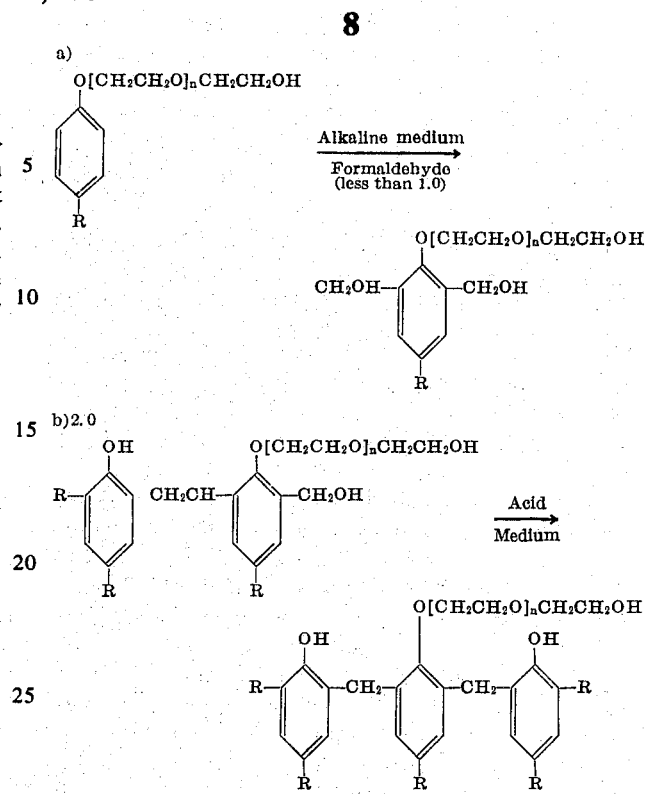

For both of the typical reactions given, linking of the phenyl groups has been shown through the ortho position; however, as before, it is recognized that such linking may take place through the ortho or para or a mixture of ortho and para positions, and such structural formulations in repetition should be so understood.

Typical aliphatic and aromatic, cycloaliphatic, aldehydes which may be employed in carrying out our condensation reaction would include, but not be limited to acetaldehyde, formaldehyde, paraformaldehyde, trioxane, furfural, benzaldehyde and alkyl benzaldehyde. Typical acid catalysts which may be employed in amounts of from 0.1 to 20 percent would include, but not be limited to, carboxylic acids, typically being $C_2$–$C_{10}$ carboxylic acid, such as oxalic acid, citric acid, acetic acid; sulfonic acids, such as p toluene sulfonic acid, benzene sulfonic acid; and mineral acids, such as hydrochloric acid, phosphoric acid and sulfuric acid. Alkaline catalysts used to prepare the methylated phenolic compounds would include, but not be limited to, of from about 0.1 to 20 percent of inorganic bases, such as sodium hydroxide, potassium hydroxide, lithium hydroxide, or basic sodium or potassium alkaline salts; e.g., sodium methylate. Typically, a condensation reaction may be carried out at a variety of temperatures ranging from approximately 15° to 90° C, for example, 40° to 70° C, in an alcohol solution with the water of condensation from reaction typically removed by heating under vacuum from a product recovered by filtration while hot.

Our water-emulsifiable polymeric hindered phenols may be employed in small amounts by directly incorporating the polymeric hindered phenol into or with the polymeric material to be stabilized. The amount of material to be employed would vary upon the degree of stabilization, shelf life, processing temperature and other factors, but generally would range from approximately 0.001 percent to 5.0 percent, for example, 0.1 to 3 percent by weight of the polymer. Although our polymeric hindered phenols have been described in particular in connection with the stabilization of polymers in aqueous or aqueous-alcohol latexes, our polymeric hindered phenols may also be employed as desired directly into a wide variety of synthetic and natural polymers in bulk and solution by blending, milling, dispersing or other techniques. In our preferred embodiment, our water-emulsifiable polymeric hindered phenols are employed by incorporating them into aqueous polymeric latex compositions, alone or in combination with other stabilizers, antioxidants, emulsifiers, dispersing agents, fillers, curing agents, accelerators, dyes, fibers, pigments, silicones, chemical blowing agents and other such additive materials. Our water-emulsifiable polymeric hindered phenols are readily incorporated into polymeric latex by merely adding the material with often just hand rather than mechanical stirring. However, in some cases, it may be desirable to incorporate small amounts of other dispersing aids or emulsifiers to promote the more rapid dispersion of our hindered phenols into a latex composition. As recognized, the amount of the polymeric hindered phenolic compositions will vary, depending upon the type of hindered phenol, component or molecule used, while the ease of emulsification will depend upon the amount of the water-soluble phenol and the degree of ethoxylation.

Our water-emulsifiable polymeric hindered phenols may be employed in natural and synthetic latexes, including, but not limited to, those polymers, such as copolymers of a diene or a vinyl benzene and terpolymers thereof, such as styrene-butadiene as well as carboxylated styrene-butadiene; that is, where unsaturated carboxylic groups in minor amounts representing from about 0.5 to 10 parts by weight of the polymer is interpolymerized into the polymer chain or incorporated therein, such carboxylic groups or additives represented by methacrylic acid, acrylic acid, itaconic acid, fumaric acid, maleic acid and the like; other polymeric dienes, such as polybutadiene, such as cis 4 polybutadiene, polyisoprene, butyl rubber, nitrile rubber such as acrylonitrile, acrylonitrile butadiene-styrene rubbers, natural rubber, blends of natural rubber with styrene-butadiene elastomer, ethylene propylene rubber copolymers, diene-modified terpolymers, and further, other nonelastomeric polymers such as acrylic resins, styrene and styrene-modified resins, short-chain fatty acids, ethylene-butene copolymers. Latex compositions may also contain other additives, such as fillers, carbon black, plasticizers, solvents, oils, waxes, imines, glycols, polyglycols, curing agents, scorch inhibitors as well as other nonwater-emulsifiable hindered phenols as well as phosphites, metal like trisnonylphenyl phosphites as well as metal salts, fatty acid esters and other such materials.

Typical hindered phenols which may be employed in our invention include those alkylated phenols containing one or more lower alkyl groups, for example, $C_1$–$C_6$ groups such as tertiary butyl groups in the sixth position, as well as those alkylene-bis alkylated phenols, such as the 2,2'-alkylene-bis-4,6 dialkyl phenols. Specific examples of such phenols would include, 2 tertiary butylparacresol, and other compounds such as those described, but not limited to those, in U.S. Pat. Nos. 2,538,355, 3,069,369, 3,103,501 and 3,149,093.

Our invention is illustrated by the following examples:

EXAMPLE 1

Preparation of a stabilizer 2,2' (4 nonyl 2,6 ethoxylated xylenol) $\alpha,\alpha'$ bis 4,6 dinonyl phenol, having an average of 12 ethoxyl gps. in the ethoxylated side chain.

To a one liter reaction flask, add 346 g of dinonyl phenol (1 mole) and 374 g of *Makon 12 (an ethoxylated nonyl phenol, having an average of 12 ethoxyl gps. in the side chain — a trademark of Stepan Chemical Company). Heat to 60°–70°C. Add 33 g of 91 percent paraformaldehyde (1.0 M) and 8.5 g of oxalic acid as catalyst. Heat the mixture to reflux and hold at reflux for 3 hours. Distill off the water of condensation under vacuum. Filter the residual viscous liquid while hot through a heated funnel to remove residual oxalic acid to give an almost quantitative yield of an amber viscous liquid, having a refractive index 25° of 1.4944. This compound corresponds to the compound of Formula II where $x$ is 1, $R_1$ and $R_2$ are nonyl, $R_4$ is ethylene and $n$ is 11.

EXAMPLE 2

Preparation of a stabilizer containing 75 percent of 2,2' (4, nonyl 2,6 ethoxylated xylenol)$\alpha,\alpha'$ bis 4,6 dinonyl phenol.

The reaction flask is charged with 281 g of Makon 12 (0.375 M), 27.5 g of nonyl phenol (0.125 M), and 346 g of dinonyl phenol (1.0 M). The mixture was heated to 60°–70C., and 24.7 g of paraformaldehyde (0.75 M) were added. As catalyst, 4 g of concentrated HCl solution were added; and the mixture was heated to reflux and agitated for 3 hours at 100°C.

The water and HCl were removed by vacuum distillation. Nitrogen was sparged through the reaction mixture to assist in removal of the HCl. The product was a clear, reddish brown, viscous liquid, having a refractive index 25° of 1.4987.

EXAMPLE 3

Preparation of a stabilizer containing 20 percent of 2,2' (4 nonyl 2,6 ethoxylated xylenol)$\alpha,\alpha'$ bis 2,4, dinonyl phenol.

Three hundred forty-six g of dinonyl phenol (1 M), 110 g of Makon 20 (0.1 M) (an ethoxylated nonyl phenol having an average of 20 ethoxyl gps), and 88 g of nonyl phenol (0.4 M) were reacted with 51 cc of 40 percent aqueous formaldehyde solution, using 6.3 g of oxalic acid as catalyst. Five hundred forty-two g of a reddish viscous liquid were obtained. Refractive index 25° 1.5053.

EXAMPLE 4

Preparation of a stabilizer containing 20 percent of 2,2' (4 octyl 2,6 ethoxylated xylenol)$\alpha,\alpha'$ bis 4,6, dinonyl phenol.

Three hundred forty-six g of dinonyl phenol (1 mole), 66 g of Triton X 100 (an ethoxylated octyl phenol containing an average of 10 ethoxy gps. per molecule—Rohm & Haas), and 88 g of nonyl phenol (0.4 M) were reacted with 24.7 g of paraformaldehyde, using hydrochloric acid as a catalyst. Four hundred seventy-six g of a clear, amber, viscous liquid, having a refractive index 25° of 1.4967 were obtained. This compound corresponds to the compound of Formula II where $x$ is 1, $R_1$ is nonyl, $R_2$ is octyl, $R_4$ is ethylene and $n$ is 9.

EXAMPLE 5

Preparation of a stabilizer mixture, containing 20 percent of 2,2' (4 nonyl 2,6, ethoxylated xylenol)$\alpha,\alpha'$ bis 4,6 dinonyl phenol, having an average of 30 ethoxyl gps.,
- 1 Mole dinonyl phenol
- 0.1 Mole Makon 30
- 0.4 Mole nonyl phenol
- 0.75 Mole formaldehyde was reacted as above, using hydrochloric acid as a catalyst. A stabilizer mixture, containing 20 percent of ethoxylated and 80 percent of nonethoxylated compound, was obtained. Refractive index 25° 1.5048.

By the same procedures, the following stabilizers and stabilizer mixtures were obtained:

EXAMPLE 6

An analogue of Example 1, having an average of 30 ethoxyl gps. in the side chain, by substituting "Makon 30" for the "Makon 12."

EXAMPLE 7

A stabilizer mixture, containing 50 percent of the stabilizer of Example 6, by using one-half mole of "Makon 30" and one-half mole of nonyl phenol to replace the "Makon 12."

EXAMPLE 8

An analogue of Example 1, having an average of 10 ethoxyl gps. in the side chain, by using Makon 10.

EXAMPLE 9

A stabilizer mixture, containing 20 percent of an analogue of Example 1, having 14 ethoxyl gps. on the molecule and 80 percent of the analagous unethoxylated compound, by using:
- 1 Mole dinonyl phenol
- 0.1 Mole Makon 14
- 0.4 Mole nonyl phenol Refractive index 25° 1.5055.

EXAMPLE 10

A stabilizer mixture by blending 70 percent of the product of Example 7 with 30 percent of the product of Example 8.

EXAMPLE 11

The stabilizer of Example 10 was tested for ease of emulsifiability in water, in comparison to the following competitive phenolic antioxidants:
1) Naugawhite*— an alkylated bis phenol
2) Santowhite L*— thiobis (disec amyl phenol)
3) Santowhite 54*— modified hindered phenol
4) Cyanox LF*— modified alkylated bisphenol
5) Hallcowhite A*— alkylated phenol
6) Hallcowhite B— alkylated phenol
*1) Trademark of Uniroyal Corp.

*2) and 3) Trademark of Monsanto Chemical Co.
*4) Trademark of American Cyanamide Co.
*5) and 6) trademark of Hallco Chemical Co.

In each case, a 40 percent emulsion was prepared by hand stirring of the compound directly into water:
1) Naugawhite — No emulsion
2) Santowhite L 13 No emulsion
3) Santowhite 54 — No emulsion
4) Cyanox LF — No emulsion
5) Hallcowhite A — No emulsion
6) Hallcowhite B — No emulsion
7) Stabilizer of Example 10 — Immediate stable emulsion (no separation after at least one week storage)

EXAMPLE 12

The stabilizer of Example 5 was tested for emulsifiability by stirring into:
1) Water
2) Water containing 1 % Lauryl Alcohol
3) Water containing Sodium Oleate
4) Tylac* (*Tylac is a trademark of International Latex Corporation.) latex emulsion No. 5022 (a styrene-butadiene carboxylated elastomer)
5) Genflo* (*Genflo is a trademark of the General Tire & Rubber Company.) latex emulsion No. 704 (a styrene-butadiene carboxylated elastomer)
6) Polysar* *Polysar is a trademark of Polymer Corporation Limited.) latex emulsion XD 132
7) GAF* (*GAF is an abbreviation for General Aniline & Film Corporation.) latex emulsion No. 500 ( a styrene-butadiene carboxylated elastomer)

Naugawhite and 2246, both commercial hindered phenolic stabilizers, were used as a control.

| | Stabilizer of Ex. 5 | Naugawhite | 2,2' methylene bis 2 tertiary butyl paracresol (2246) |
|---|---|---|---|
| Water | good | N.E. | No Dispersion |
| Water & Lauryl Alcohol | good | Poor | No Dispersion |
| Water & Sodium Oleate | very good | Good | Fair |
| Tylac No. 522 | very good | N.E. | No Dispersion |
| Genflo No. 704 | good | N.E. | No Dispersion |
| Polysar No. XD132 | good | N.E. | No Dispersion |
| GAF No. 500 | good | N.E. | No Dispersion |

EXAMPLE 13

The stabilizer of Example 5 was tested for stabilization of various polymer latex emulsions by heat aging. Strips of Whatmen No. 1 filter paper were dipped into latex emulsions and hung up to air dry. The dried strips were placed in a revolving shelf oven for the following heat cycles:
- A — 24 hours at 110°C.
- B — A + 120° — 24 hours
- C — B + 135°C. — 24 hours
- D — C + 150°C. — 6 hours Light reflectance was measured using a photovolt reflectance meter. The higher the number, the less the discoloration and embrittlement.

| Tylac 8140 Latex + Latex | Genflo 704 Latex + Latex | Polyco 2460 Latex + Latex |

| | 1% 5 | alone | 1% 5+ | Alone | 1% 5 | Alone |
|---|---|---|---|---|---|---|
| 24 hours at 110°C. — "A" | 85 | 72 | 86 | 85 | 83 | 73 |
| "A" + 24 hours at 120°C. — "B" | 78 | 50 | 78 | 78 | 66 | 52 |
| "B" + 24 hours at 135°C. —"C" | 62 | 18 | 61 | 57 | 41 | 33 |
| "C" + 6 hours at 150°C. — "D" | 42 | 11 | 49 | 41 | 22 | 16 |

Tylac 8140 and Genflo 704 are carboxylated styrene-butadiene elastomeric polymers.

methylene 2460 is a styrene-butadiene polymer.

We claim:

1. A hindered polymeric phenol represented by the formula:

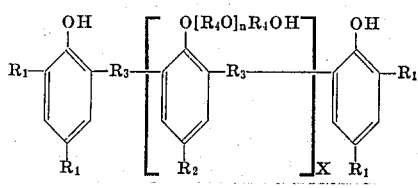

wherein
 a. $R_1$ is a $C_1$–$C_{16}$ alkyl radical;
 b. $R_2$ is a $C_1$–$C_{12}$ alkyl radical;
 c. $R_3$ is a methylene radical or a bis methy-lene ether radical;
 d. $n$ is a number from about 10 to 100;
 e. $x$ is a number 1, 2, or 3; and
 f. $R_4$ is a $C_2$–$C_3$ divalent alkylene radical.

2. The phenol of claim 1 wherein $R_1$ is a methyl, tertiary butyl, octyl or nonyl radical.

3. The phenol of claim 1 wherein $R_4$ is ethylene as obviously intended.

4. The phenol of claim 1 wherein $R_1$ in the ortho position is a tertiary butyl, octyl or nonyl radical, $R_2$ and in the para position $R_1$ are methyl, octyl or nonyl radicals, and $R_4$ is a —$CH_2CH_2$13 radical.

5. The phenol of claim 1 wherein $n$ is a number from about 10 to 60.

6. The phenol of claim 1 wherein $R_2$ is a $C_8$–$C_9$ alkyl radical.

7. The phenol of claim 1 where x is 1, R, is nonyl, $R_2$ is nonyl, $R_3$ is methylene, $R_4$ is ethylene and $n$ is 11.

8. The phenol of claim 1 where $x$ is 1, $R_1$ is nonyl, $R_2$ is octyl, $R_3$ is methylene, $R_4$ is ethylene and $n$ is 9.

* * * * *

UNITED STATES PATENT OFFICE
CERTIFICATE OF CORRECTION

Patent No. 3,699,173    Dated October 17, 1972

Inventor(s) Edward V. Osberg and Walter Beck

It is certified that error appears in the above-identified patent and that said Letters Patent are hereby corrected as shown below:

Column 14, claim 3, lines 1 and 2, delete "as obviously intended".

Signed and sealed this 29th day of May 1973.

(SEAL)
Attest:

EDWARD M. FLETCHER, JR.　　　　　ROBERT GOTTSCHALK
Attesting Officer　　　　　　　　Commissioner of Patents